(12) United States Patent
Lehtonen-Krause

(10) Patent No.: US 7,693,321 B2
(45) Date of Patent: Apr. 6, 2010

(54) MR METHOD AND APPARATUS FOR DETERMINING CORONAL AND SAGITTAL IMAGE PLANES FROM AN IMAGE DATA SET OF A KNEE JOINT

(75) Inventor: Sari Lehtonen-Krause, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1177 days.

(21) Appl. No.: 11/220,012

(22) Filed: Sep. 6, 2005

(65) Prior Publication Data
US 2006/0050945 A1 Mar. 9, 2006

(30) Foreign Application Priority Data
Sep. 6, 2004 (DE) .................. 10 2004 043 057

(51) Int. Cl.
*G06K 9/00* (2006.01)
(52) U.S. Cl. ..................... 382/131; 382/128
(58) Field of Classification Search .......... 382/128, 382/131
See application file for complete search history.

(56) References Cited

U.S. PATENT DOCUMENTS

| 5,390,258 | A | * | 2/1995 | Levin ..................... 382/131 |
| 6,529,762 | B1 | | 3/2003 | Ladebeck |
| 2004/0167390 | A1 | | 8/2004 | Alexander et al. |

OTHER PUBLICATIONS

Kim et al., "Measurement of femoral neck anteversion in 3D. Part 2: 3D modelling method", 2000, Medical & Biological Engineering & Computing, vol. 38, 610-616.*
Calvo et al., "High-resolution MRI detects cartilage swelling at the early stages of experimental osteoarthritis", 2001, Osteoarthritis and Cartilage, OARSI, 463-472.*
"Anatomical Analysis of the Femoral Condyle in Normal and Osteoarthritic Knees," Matsuda et al., Journal of Orthopaedic Research, vol. 22, (2004) pp. 104-109.
"Fully Automatic Identification of AC and PC Landmarks on Brain MRI Using Scene Analysis," Vérard et al., IEEE Trans. on Medical Imaging, vol. 16, No. 5, Oct. 1997, pp. 610-616.

* cited by examiner

*Primary Examiner*—Vikkram Bali
*Assistant Examiner*—Katrina Fujita
(74) *Attorney, Agent, or Firm*—Schiff Hardin LLP

(57) ABSTRACT

In a method for determination of coronal and sagittal planes for the subsequent acquisition of new magnetic resonance slice images or the representation of magnetic resonance slice images from an existing image data set of a knee joint, starting from a data set representing a transversal slice image of the knee joint, the slice image is analyzed using at least one analysis algorithm to identify the medial and the lateral condyles of the femoral bone head shown as a transversal section and a point lying thereon in a section that defines a coronal plane that is tangential to the condyles. The sagittal plane proceeding perpendicular to the defined coronal plane is then determined. Coronal or sagittal slice images are then acquired or represented with orientations dependent on the identified planes.

5 Claims, 3 Drawing Sheets

MR METHOD AND APPARATUS FOR DETERMINING CORONAL AND SAGITTAL IMAGE PLANES FROM AN IMAGE DATA SET OF A KNEE JOINT

BACKGROUND OF THE INVENTION

1. Field of the Invention

The present invention concerns a method for determining of distinguished coronal and sagittal planes from an already-present image data set of a knee joint for the subsequent acquisition of new magnetic resonance slice images or the representation of magnetic resonance slice images.

2. Description of the Prior Art

Diseases in the region of the knee joint are painful and impair the patient in terms of freedom of movement. Magnetic resonance tomography is a gentle method for examination of the knee joint. In order to acquire an optimally large amount of information from the examination region, so as to be able to generate meaningful slice image therefrom, the shoulder joint is acquired in the form of a number of slice image sets that are respectively acquired in specific planes. The data acquisition ensues in the transversal, coronal and sagittal directions, but these planes need not be exactly perpendicular to one another but can, if applicable, be tilted relative to one another. Each slice image set is composed of, for example, twenty to forty individual slice images that all have been acquired in parallel slice planes abutting one another. The entire examination volume can be acquired in this manner.

Difficulties arise, however, when a follow-up examination is to ensue at a later point in time in order to implement therapy monitoring. Because the individual slice image groups, or the various measurement protocols (for example T1 or T2), typically are set manually in coronal, sagittal and transversal orientation by the apparatus operator (technician), difficulties occur with regard to reproducing the original slice plane positioning. This applies even when the same operator does the setting at a later point in time, but is particularly a problem when a different operator acquires the later data. The slice images previously acquired do not normally exist as references, such that the later technician cannot make use of them for orientation purposes.

Similar problems also occur when acquired slice images are to be evaluated at a later point in time. Here as well each image representation ensues using slice images in coronal, transversal or sagittal orientations. Depending on how the diagnosing physician now places the respective orientation, different plane orientations and therewith different image representations can occur. Again, no reproducibility is achieved.

SUMMARY OF THE INVENTION

An object of the present invention is to provide a method that enables a reproducible plane determination of the coronal and sagittal planes under the above-described circumstances in order to enable a reproducible slice image acquisition or slice image representation.

The above object is achieved in accordance with the invention by a method of the previously-described type wherein, starting from a data set representing a transversal slice image of the knee joint, this slice image is analyzed using at least one analysis algorithm to identify the medial and the lateral condyles of the femoral bone head shown as a transversal section and a point lying thereon in a section that defines the coronal plane, and wherein the sagittal plane proceeding perpendicular to the defined coronal plane is identified, and wherein coronal or sagittal slice images are acquired or represented at orientations dependent on the identified planes.

Using one or more analysis algorithms, in the inventive method anatomical structures of the knee joint can be unambiguously identified in the transversal slice image and used for plane determination. For this purpose, both condyles of the femoral bone head that are seen in the transversal slice image are inventively identified. Via the analysis algorithm it can be defined precisely which regions of the condyles of the femoral bone shown as a transversal section are relevant in order to place the plane by means thereof. The plane preferably is placed tangential to the condyles that appear rounded in the slice image, i.e. the two identified points are determined by the algorithm, via which identified points the coronal plane (and therewith the entire examination volume) is now placed along a straight line through the joint.

In a second step the sagittal plane is identified by orientation relative to the already-determined coronal plane. This proceeds orthogonally to the coronal plane, i.e. the orthogonal (which, as a line, defines the position of the sagittal plane) is placed on the determined line defining the coronal plane. This also ensues in the transversal slice image using the analysis algorithm already used, or a different analysis algorithm.

Now the coronal and the sagittal planes are also defined in addition to the already-known transversal plane, all exclusively using anatomical structures that are typical for the knee joint. A subsequent image acquisition can now ensue on the basis of these automatically-determined planes, just as corresponding slice images along these planes can be determined form an already-acquired three-dimensional image data set.

The fact that anatomical landmarks are used for automatic plane determination allows a reproducible determination of the planes. Generally, the anatomy in question does not change. The only requirement is that the transversal slice image exposure, which is the basis for the anatomy analysis, be essentially the same in the follow-up exposures. This is true in the cases of a reproducible image representation from already-present image data. Here as well as a subsequent evaluation can always ensue using images that reproducibly lie in the same plane as in the first evaluation.

In an embodiment of the invention, a center point in which the coronal and the sagittal planes are shifted is determined for a subsequent slice image acquisition after the determination of the coronal or the sagittal plane using at least one analysis algorithm. From this center point, a circle (approximating the shape of a transverse slice of the femoral bone head) around the femoral bone head and its middle point is determined. The middle point is the central point in which both planes that serve as central planes for the subsequently-acquired plane-parallel slice images are placed. This embodiment of the invention enables a coronal plane and a sagittal plane to be defined as a center plane for the acquisition of subsequent planes of parallel slice image families. A previously-determined coronal or sagittal plane is inventively shifted in a plane-parallel manner into the middle of the femoral bone head (likewise serving as an anatomical landmark) that is determined by an analysis algorithm. This plane forms the central plane for the later slice images that are subsequently acquired in a plane-parallel manner on both sides thereof. The determination of the center of the femoral bone head is likewise possible without anything further using the analysis algorithm because the bone is essentially visible horseshoe-shape in the transversal slice image. A circular line whose position and radius are oriented on the shape or contour of the bone section is approximated to this as closely as possible is now automatically determined using the contours of the bone section. At this circle, the middle point that forms the center point into which the planes are shifted is now determined by the analysis algorithm. This embodiment of the invention thus enables an automatic central plane determination. Alternatively, starting from the determination of both coronal and sagittal orientation planes, the diagnosing physician can determine in which direction the examination volume should be acquired, starting from both of these orientation planes.

The transversal slice image that is the basis for the anatomy analysis can inventively be selected from a family acquired immediately beforehand or from an existing family of slice images acquired in an examination volume in the knee joint region. This slice image selection can ensue manually or automatically, meaning that the transversal plane can be determined automatically or manually.

The above object also is achieved in accordance with the invention by a magnetic resonance system fashioned for implementation of the method of the above-described method.

DESCRIPTION OF THE PREFERRED EMBODIMENTS

Figure 1:
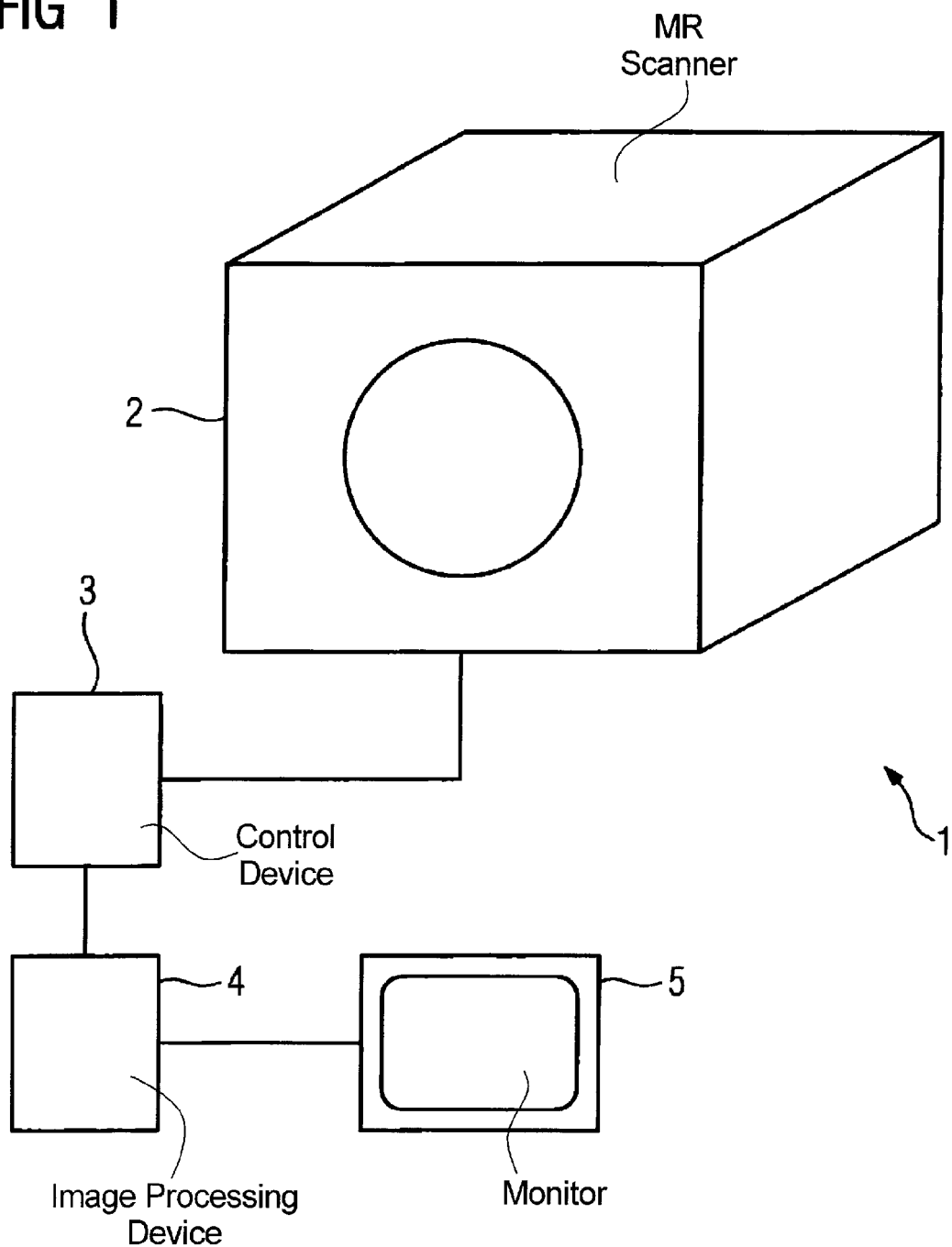
FIG. 1 is a schematic block diagram of a magnetic resonance imaging apparatus constructed and operating in accordance with the principles of the present invention.

FIG. 1 shows an inventive magnetic resonance system 1 that has an MR scanner 2 connected to a control device 3 (controlling the operation) with an associated image processing device 4 that includes a suitably fashioned or programmed calculation device. The control device 3 controls the entire operation flow, including the image acquisition; the image processing ensues in the image processing device 4, with which a monitor 5 is connected for image display.

For a knee joint examination, three localizer exposures, (overview images), are initially acquired as is typical in three defined orthogonal orientations of the knee joint region, the localizer exposures serving for the generation of a rough overview image. A transversal plane that proceeds through the knee joint is now automatically determined using these localizer exposures. A first transversal slice image family is now automatically acquired based on this automatically-determined alignment of the transversal plane. These transversal slice images, for example twenty to forty individual images, as a whole describe the examination volume (thus the knee joint). An identified slice image in which specific anatomical structures are visible is now (preferably automatically) selected from this transversal slice image family. This selection is explained with regard to FIGS. 2 and 3. The selection can specifically ensue with regard to the sought and required structures, i.e. the slice image best suited for the analysis to be implemented is selected.

Figure 2:
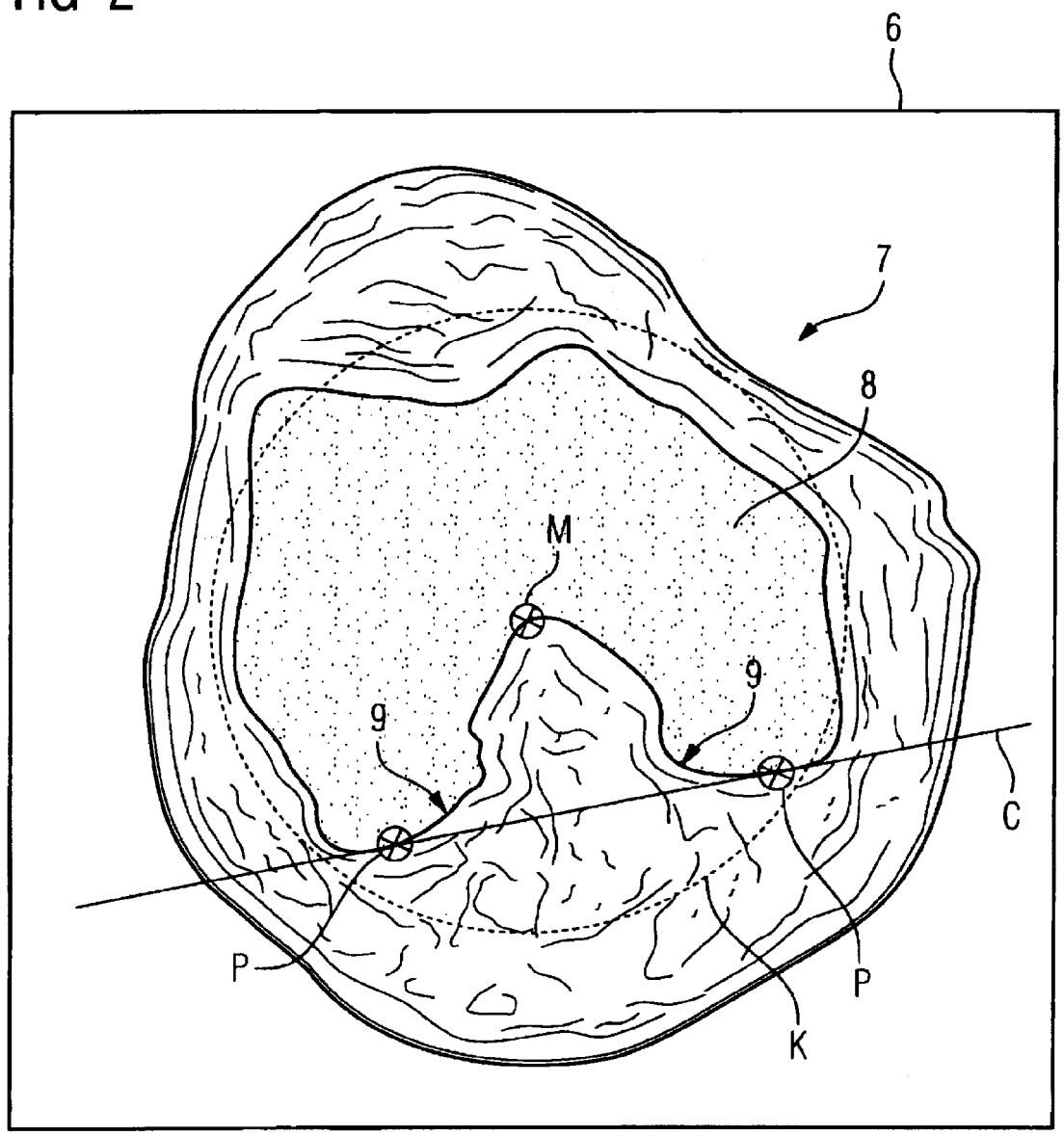
FIG. 2 illustrates a transverse slice image through a knee joint for explaining identification of the coronal plane and the center, in accordance with the present invention.

FIG. 2 shows a transversal slice image 6 that shows the knee joint 7. The transversal slice through the femoral bone head 8 is clearly visible with its typical horseshoe shape.

Using a suitable analysis algorithm (for example an edge detection algorithm), the image processing device 4 now determines in the slice image 6 the lateral and the medial condyle 9 that are quasi-located at the ends of the horseshoe-shaped femoral bone head 8. There a point P (marked by the cross symbol) is determined through which the line C is then placed, the line C being the reference line for the coronal plane. Both points P could be determined so that the line C runs tangential to both condyles 9.

The outer contour of the femoral bone head 8 is subsequently detected by the analysis algorithm or a further analysis algorithm, and this is described with an approximate circular line K. This means that a region of interest is defined by the circular line K that orients on the shape and position of the transversal slice image of the femoral bone head. At this circle surrounded by the circular line K, the middle point M (here also shown by a cross symbol) is now automatically determined by the analysis algorithm.

In the next step (see FIG. 3), the straight line or line C that defines the coronal plane is now shifted parallel to the plane into the middle point M, as is shown by the straight line or line C'. This line C' now defines the central coronal plane, individual slices of which are acquired on both sides in subsequent slice image acquisitions. This means that the original coronal plane defined by the line C serves for the alignment and the correct angulation of the coronal slice images, however, does not represent the central plane for the subsequent acquisition of the slice image family.

Figure 3:
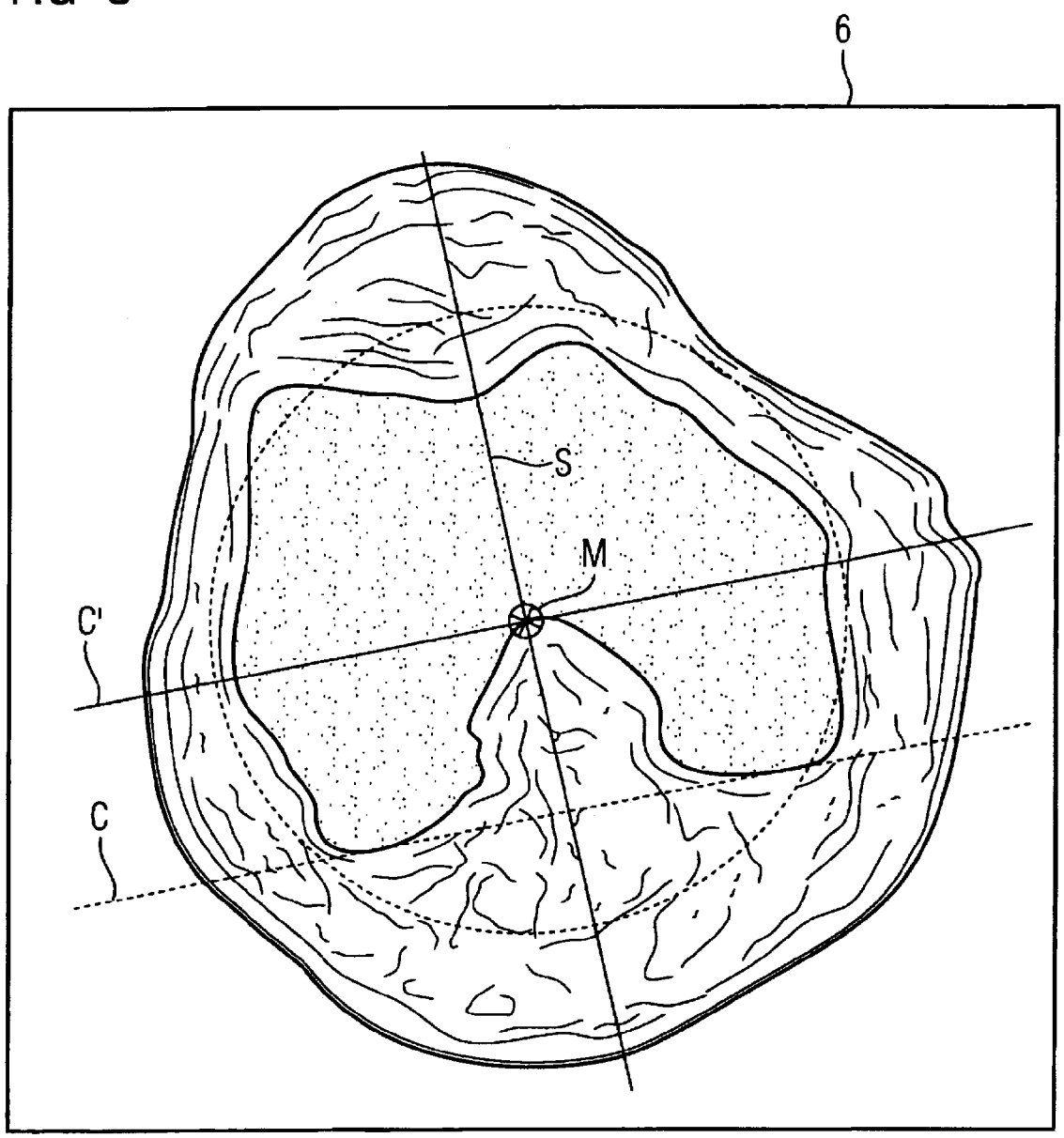
FIG. 3 shows the slice image of FIG. 2, with the coronal plane, as well as the sagittal plane proceeding therethrough, shifted into the center point.

The sagittal plane is now determined in the next step (see FIG. 3). This is perpendicular to the coronal plane defined by the line C'. In FIG. 3 The sagittal plane is defined by the line. S. Because this line S (and therewith the sagittal plane) also runs through the middle point M that forms the central point, it also represents the central plane for subsequent slice image acquisitions associated therewith.

As described, a reproducible plane determination is inventively determined solely using distinguished anatomical knee joint structures, namely the condyles and the tibia. The determined coronal and sagittal lines or planes C and S serve for the ultimate plane definition as well as for the correct angulation for the subsequent slice image families to be acquired. The subsequent image acquisition then ensues using the determined distinguished planes, controlled by the control device 3 of the magnetic resonance system 1.

Although modifications and changes may be suggested by those skilled in the art, it is the intention of the inventor to embody within the patent warranted hereon all changes and modifications as reasonably and properly come within the scope of the inventor's contribution to the art.

I claim as my invention:

1. A method a coronal plane and a sagittal plane from a displayed tomographic image of a knee joint, comprising the steps of:

displaying a transverse tomographic image of a knee joint, said image being based on an underlying image data set;

electronically, automatically analyzing the underlying data set using at least one analysis algorithm to identify the medial condyle and the lateral condyle of the femoral bone head in said tomographic image of the knee joint, and to identify a point at said medial condyle and a point at said lateral condyle that, in combination, define a tangential coronal plane that is tangential to the medial condyle and to the lateral condyle, by identifying a middle point of the femoral bone head into which said coronal plane and said sagittal plane are shifted for acquiring a subsequent slice image, after identification of said tangential coronal plane and said sagittal plane and identifying a circle approximating a shape of a transverse section of the femoral bone head around said femoral bone head and said middle point, and using said middle point as a central point at which said tangential coronal plane and said sagittal plane serve as central planes for acquiring a plurality of plane-parallel slice images of said knee joint;

electronically identifying the sagittal plane proceeding perpendicular to the identified tangential coronal plane; and acquiring or representing at least one of a coronal slice image and a sagittal slice image oriented dependent on at least one of the identified tangential coronal plane and the identified sagittal plane.

2. A method as claimed in claim 1 comprising selecting said transverse tomographic image from a pre-existing plurality of tomographic slice images comprising a family acquired from an examination volume comprising said knee joint.

3. A method as claimed in claim 2 comprising manually selecting said transverse tomographic slice image.

4. A method as claimed in claim 2 comprising automatically electronically selecting said transverse tomographic image.

5. A magnetic resonance imaging apparatus comprising:

a magnetic resonance scanner adapted to receive an examination subject therein to acguire magnetic resonance data from the subject;

a computer connected to said magnetic resonance scanner for operating said magnetic resonance scanner to acguire said magnetic resonance data;

said computer being provided with an image data set representing a transverse tomographic image of a knee joint of the subject, and said computer being configured to automatically analyze by executing said data set by executing an analysis algorithm to identify the medial condyle and the lateral condyle of the femoral bone head of said knee joint, and to identify a point on the medial condyle and a point on the lateral condyle that, in combination, define a tangential coronal plane that is tangential to the medial condyle and to the lateral condyle, said computer being configured to automatically analyze said underlying data set by executing said analysis algorithm to identify a middle point of the femoral bone head into which said tangential coronal plane and said sagittal plane are shifted for acquiring a subsequent slice image, after identification of said tangential coronal plane and said sagittal plane, and to identify a circle approximating a shape of a transverse section of the femoral bone head around said femoral bone and said middle point, and to use said middle point as a central point at which said tangential coronal plane and said sagittal plane serve as central planes of acquiring a plurality of plane-parallel slice images of said knee joint and said computer electronically identifying the sagittal plane proceeding perpendicular to the identified tangential coronal plane; and said computer being configured to control acguisition or representation of at least one of a coronal slice image and a sagittal slice image oriented dependent on at least one of the identified coronal plane and the identified sagittal plane.

* * * * *